United States Patent [19]

Onoda et al.

[11] Patent Number: 5,317,602
[45] Date of Patent: May 31, 1994

[54] BASE-BAND DELAYED DETECTOR WITH SYNCHRONIZING CIRCUIT

[75] Inventors: Masahiro Onoda; Yoshifumi Toda, both of Kawasaki, Japan

[73] Assignee: Fujitsu Limited, Kawasaki, Japan

[21] Appl. No.: 851,559

[22] Filed: Mar. 13, 1992

[30] Foreign Application Priority Data

Mar. 14, 1991 [JP] Japan .................................. 3-074777

[51] Int. Cl.$^5$ .................................... H04L 7/033
[52] U.S. Cl. .................................. 375/118; 375/106; 375/80; 375/111
[58] Field of Search ............... 328/63, 72; 329/307, 329/325, 360; 375/106, 118, 119, 120, 81, 80, 97, 94, 111

[56] References Cited

U.S. PATENT DOCUMENTS

| | | | |
|---|---|---|---|
| 3,993,956 | 11/1976 | Gilmore et al. | 325/320 |
| 4,535,459 | 8/1985 | Hogge, Jr. | 375/120 |
| 4,949,357 | 8/1990 | Sehier | 375/120 |
| 5,117,135 | 5/1992 | Lee et al. | 375/120 |
| 5,175,544 | 12/1992 | McKeen | 375/111 |

FOREIGN PATENT DOCUMENTS 0079107  5/1983  European Pat. Off. .
0353779  2/1990  European Pat. Off. .

Primary Examiner—Stephen Chin
Assistant Examiner—Hai H. Phan
Attorney, Agent, or Firm—Staas & Halsey

[57] ABSTRACT

A base-band delayed detector has an operation circuit for performing a delayed detecting operation with respect to an input signal, the operation circuit outputting an altered signal having a predetermined symbol rate. The base-band delayed detector includes a clock generator for generating a clock signal having a frequency twice as large as the symbol rate, the clock signal being used as a timing signal in the operation circuit, a synchronizing circuit for synchronizing the clock signal with the altered signal output from the operation circuit and a data determination circuit for obtaining output data from the altered signal at a predetermined timing based on the clock signal synchronized with the altered signal.

10 Claims, 7 Drawing Sheets

BASE-BAND DELAYED DETECTOR WITH SYNCHRONIZING CIRCUIT

BACKGROUND OF THE INVENTION (1) Field of the Invention

The present invention generally relates to a base-band delayed detector, and particularly to a base-band delayed detector in which a phase of a clock signal used for a delayed detecting operation is controlled based on an output signal of the delayed detecting operation.

(2) Description of Related Art

A conventional base-band delayed detector operating in accordance with a $\pi/4$ shifted QPSK (Quadrature Phase Shift Keying) is shown in FIG. 1.

Referring to FIG. 1, this base-band delayed detector has mixers 51 and 52, a local oscillator 53, a shifter 54, low pass filters 55 and 56, analog to digital converters 57 and 58, an operation circuit 59 and clock generator 63. The mixer 51 converts an IF signal supplied from a circuit (not shown) provided prior thereto into a base band signal having a frequency falling within a base band, by using a local signal output from the local oscillator 53. The shifter 54 shifts a phase of the local signal by $\pi/2$. The mixer 52 converts the IF signal into a base band signal by using the shifted local signal. Each of the low pass filters 55 and 56 damps a sum component of a corresponding base band signal and allows a differential component thereof to pass through it. The operation circuit 59 carries out a delayed detecting operation with respect to I-channel data and Q-channel data which are obtained through the base band signals supplied thereto respectively via the analog to digital converters 57 and 58. The analog to digital converters 57 and 58 and the operation circuit 59 are operated in synchronism with a timing clock signal output from the clock generator 63. The base-band delayed detector also has data discriminators 60 and 61, a parallel to serial converter 62 and a BTR (Bit Timing Recovery) circuit 64. Each of the data discriminators 60 and 61 generates discriminated data from the output data of the operation circuit 59 in synchronism with a clock signal. The parallel to serial converter 62 converts parallel data supplied from each of the discriminators 60 and 61 into serial data. The BTC circuit 64 generates the clock signal used for operation of the discriminators 60 and 61 and the parallel to serial converter 62.

The IF signal is defined as $\cos(\omega_c \cdot t + \phi)$ and the local signal is defined as $\cos(\omega_L \cdot t + \theta)$, where $\phi$ is a modulation signal component and a relationship $\omega_c \approx \omega_L$ stands. In this case, the above base-band delayed detector operates as follows.

The mixer 51 converts the IF signal $\cos(\omega_c \cdot t + \phi)$ into a base band signal by using the local signal $\cos(\omega_L \cdot t + \theta)$. The mixer 52 converts the IF signal $\cos(\omega_c \cdot t + \phi)$ into another base band signal by using the shifted local signal $-\sin(\omega_L \cdot t + \theta)$. As the sum components of the base band signals are respectively damped by the low pass filters 55 and 56, the differential component $\cos(\Delta\omega \cdot t + \phi - \theta)$ of the first base band signal is output from the low pass filter 55, and the differential component $\sin(\Delta\omega \cdot t + \phi - \theta)$ of the second base band signal is output from the low pass filter 56. $\Delta\omega$ is defined as $\Delta\omega = \omega_c - \omega_L$.

In a case where $\Delta\omega = 0$, the differential components are respectively represented by $\cos(\phi - \theta)$ and $\sin(\phi - \theta)$. In this case, as only $\phi$ varies with the passage of time in the signal after passing through each of the low pass filters 55 and 56, an eye pattern in which signals are superimposed seems to stop. There is a phase difference $\theta$ between the IF signal and the local signal, so that the eye pattern seems to stop in either a state (A) shown in FIG. 2A, a state (B) shown in FIG. 2B or an intermediate state between the states (A) and (B). In a case where $\Delta\omega \neq 0$, the eye pattern seems to gradually vary with the passage of time, in an order of states: (A)→(B)→(A)→(B)→. . . In the base-band delayed detector, as $\omega_c$ and $\omega_L$ are in synchronism with each other, the eye pattern normally seems to vary.

The analog to digital converters 57 and 58 respectively output the following signals $X_k$ and $Y_k$ in synchronism with the clock signal of the clock generator 63:

$$X_k = \cos(\Delta\omega \cdot t_k + \phi_k - \theta)$$

$$Y_k = \sin(\Delta\omega \cdot t_k + \phi_k - \theta)$$

The operation circuit 59 carries out the following operation with respect to the above signals $X_k$ and $Y_k$ in synchronism with the clock signal of the clock generator 63:

$$\begin{aligned}
I_k' &= X_k X_{k-1} + Y_k Y_{k-1} \\
&= \cos[\Delta\omega \cdot (t_k - t_{k-1}) + (\phi_k - \phi_{k-1})] \\
Q_k' &= Y_k X_{k-1} + X_k Y_{k-1} \\
&= \sin[\Delta\omega \cdot (t_k - t_{k-1}) + (\phi_k - \phi_{k-1})]
\end{aligned}$$

where $t_k$ is a k-th time at which the analog to digital converters 57 and 58 performs sampling, $t_{k-1}$ is a time prior to the time $t_k$ by one symbol time, $X_k$, $Y_k$ and $\phi_k$ are respectively X, Y, and $\phi$ at the time $t_k$, and $X_{k-1}$, $Y_{k-1}$ and $\phi_{k-1}$ are respectively X, Y, and $\phi$ at the time $t_{k-1}$. As one symbol time $\Delta t = t_k - t_{k-1}$ is constant and the difference $\Delta\omega$ is approximately equal to zero ($\Delta\omega \approx 0$), $I_k'$ and $Q_k'$ can be represented by the following formulas.

$$I_k' = \cos(\phi_k - \phi_{k-1})$$

$$Q_k' = \sin(\phi_k - \phi_{k-1})$$

In a case where data (I, Q) is transmitted by a transmitter in accordance with the following relationship between the data (I, Q) and the amount of phase shift $\Delta\phi(=\phi_k - \phi_{k-1})$,

| [I] | [Q] | [$\Delta\phi$] |
|---|---|---|
| 1 | 1 | $\pi/4$ |
| 0 | 1 | $3 \cdot \pi/4$ |
| 0 | 0 | $-3 \cdot \pi/4$ |
| 1 | 0 | $-\pi/4$ | the following received data $(I_k, Q_k)$ is obtained.

If $I_k' > 0$, $I_k = 1$.
If $I_k' < 0$, $I_k = 0$.
If $Q_k' > 0$, $Q_k = 1$.
If $Q_k' < 0$, $Q_k = 0$.

In the base-band delayed detector described above, it is necessary to supply the clock signals to the analog to digital converters 57 and 58, the operation circuit 59, the data discriminators 60 and 61 and the parallel to serial converter 62. However, in a circuit provided prior to the operation circuit 59, where the eye pattern varies with the passage of time, it is hard to detect edges of modulated signals and to generate a clock signal having a pertinent phase.

Thus, in the conventional base-band delayed detector, the clock generator 63 must generate a clock signal having a frequency much larger than a symbol rate of the base-band signal. The clock signal, having a frequency which is, for example, 36 times the symbol rate, is used in operations in the analog to digital converters 58 and 57 and the operation circuit 59.

In addition, it is possible to propose a base-band delayed detector in which the clock generator generates a clock signal having a frequency slightly higher than the symbol rate of the base band symbol, and output data from the operation circuit 59 is converted into an analog signal by a digital to analog converter.

However, in a case where a clock signal having a frequency much higher than the symbol rate is used, the amount of electric power used in the base-band delayed detector is increased. In a case where the digital to analog converter is provided in the base-band delayed detector, a circuit in the base-band delayed detector becomes large scale in nature.

SUMMARY OF THE INVENTION

Accordingly, a general object of the invention is to provide a novel and useful base-band delayed detector in which the disadvantages of the aforementioned prior art are eliminated.

A more specific object of the present invention is to provide a base-band delayed detector which does not require an increase in the amount of electric power used therein.

Another object of the present invention is to provide a base-band delayed detector in which a circuit therein need not become large scale in nature.

The above objects of the present invention are achieved by a base-band delayed detector having operation means for performing a delayed detecting operation with respect to an input signal, the operation means outputting an altered signal having a predetermined symbol rate, and the base-band delayed detector comprising clock generation means for generating a clock signal having a frequency 2n times as high as the symbol rate, synchronizing means, coupled to the operation means and the clock generation means, for synchronizing the clock signal with the altered signal output from the operation means, and data determination means, coupled to the synchronizing means, for obtaining output data from the altered signal at a predetermined timing based on the clock signal synchronized with the altered signal.

According to the present invention, the clock signal having a frequency 2n times as high as the symbol rate is used as a timing signal in the operation circuit for performing a delayed detecting operation. Thus, it may be unnecessary to use a clock signal having a frequency much higher than the symbol rate, even if there are no other circuits such as a digital to analog converter. In a case where the clock signal having a frequency twice as large as the symbol rate is used, the frequency of the clock signal used in the operation circuit can be decreased. Thus, the base-band delayed detector according to the present invention is prevented from requiring an increased amount of electric power used therein and from becoming large scale in nature.

Additional objects, features and advantages of the present invention will become apparent from the following detailed description when read in conjunction with the accompanying drawings.

DESCRIPTION OF THE PREFERRED EMBODIMENTS

A description will now be given of the principle of a first embodiment of the present invention with reference to FIGS. 3 and 4.

Figure 3:
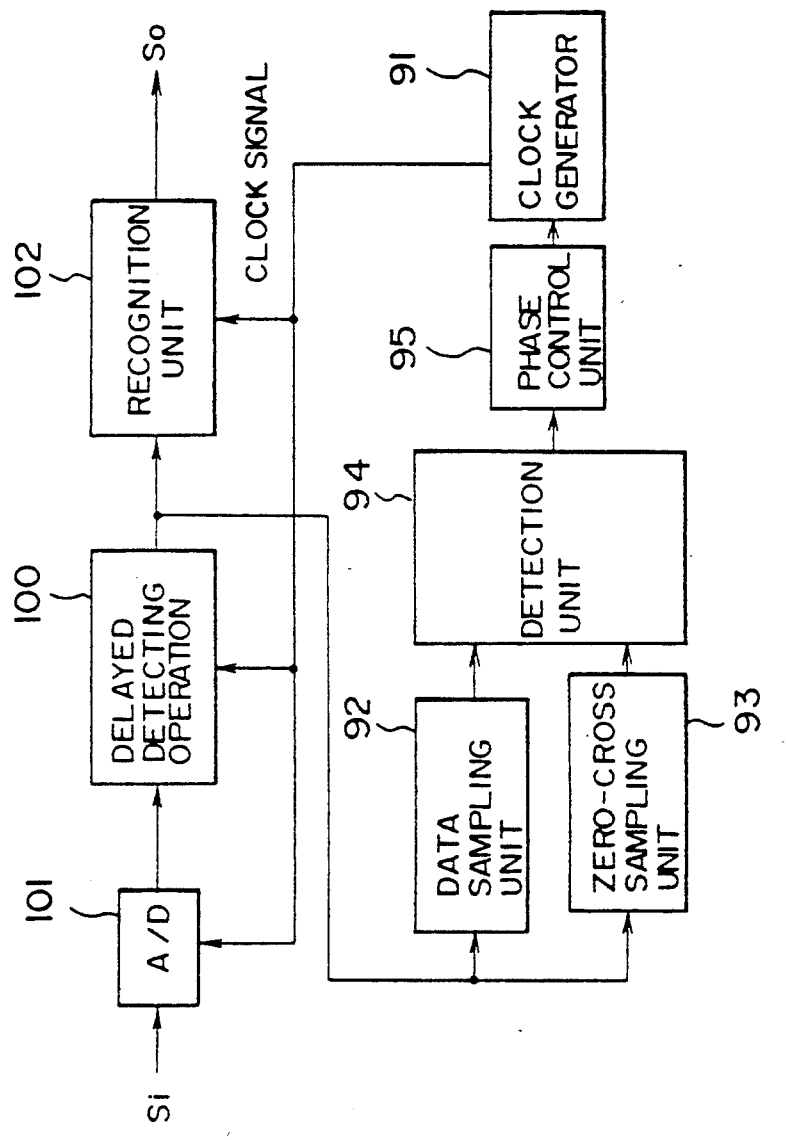
FIG. 3 is a block diagram illustrating an essential configuration of a base-band delayed detector according to a first embodiment of the present invention.
Figure 4:
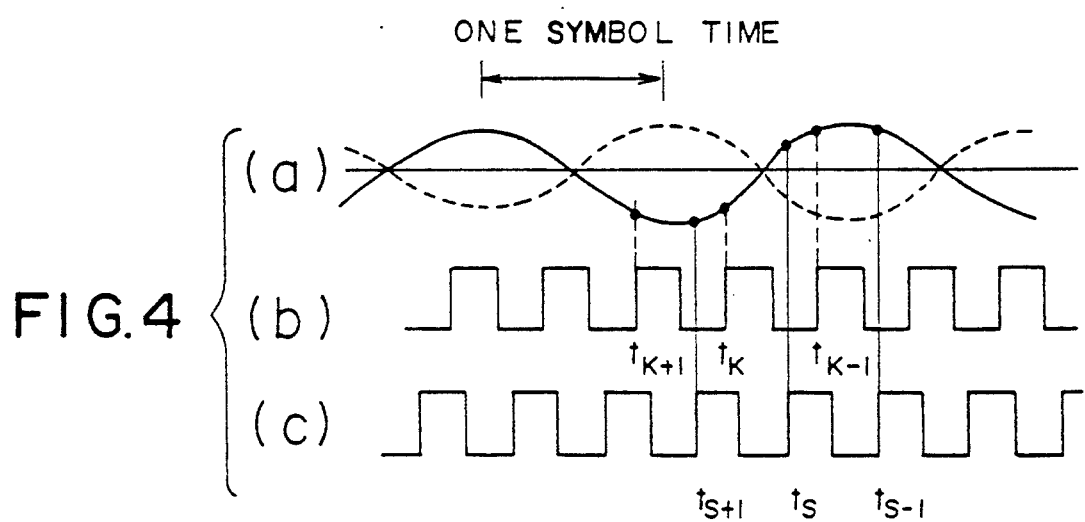
FIG. 4 is a timing chart illustrating a relationship between clock signals and a base band signal in the base-band delayed detector according to the first embodiment of the present invention.

Referring to FIG. 3, which shows an essential part of a base-band delayed detector, a base-band signal Si varying in accordance with a predetermined symbol rate (f) is supplied to an analog to digital converter 101. A clock generator 91 generates a clock signal having a frequency (2f) twice as large as the symbol rate (f) of the input base-band signal. The analog to digital converter 101 converts the input base-band signal Si into digital data in synchronism with the clock signal. A delayed detecting operation unit 100 carries out a delayed detecting operation with respect to the data, supplied from the analog to digital converter 101, in synchronism with the clock signal. A data sampling unit 92 samples the output data from the delayed detecting operation unit 100, at a point close to an opening of the eye pattern in which base-band signals are superimposed, in synchronism with a data sampling clock having a frequency (f) half that of the clock signal (2f). A zero-cross point sampling unit 93 samples the output data from the delayed detection operation unit 100, at a zero-cross point of the eye pattern, in synchronism with a zero-cross sampling clock signal having a frequency (f) half that of the clock signal (2f). There is a reversal relationship (where one is high, the other is low and vice versa) between the data sampling clock signal and the zero-cross point sampling clock signal. A detection unit 94 detect an amount of phase shift of the cock signal (2f) with respect to the output data from the delayed detecting operation unit 100 based on a variation of polarities of data sampled by the data sampling unit 92 and the zero-cross point sampling unit 93. The amount of phase shift obtained by the detection unit 94 is supplied to a phase control unit 95. The phase control unit 95 controls a phase of the clock signal (2f), generated by the clock generator 91, based on the amount of phase shift supplied thereto. When the output data from the delayed detecting operation unit 100 and the clock signal (2f) become in synchronism with each other, a data recognition unit 102 recognizes detection data so in synchronism with the same clock signal as the data sampling clock.

The output data from the delayed detecting operation unit 100 is sampled, in synchronism with the clock signal (2f), alternatively, by the data sampling unit 92 and the zero-cross sampling unit 93. In a case where data sampled by the zero-cross sampling unit 93 at a time $t_k$ has the same polarity as data sampled by the data sampling unit 92 at the next time $t_{k+1}$ in the clock signal (2f), as shown in FIG. 4(a), the detection unit 94 determines that there is phase lag of the clock signal (2f) with respect to the output data from the delayed detecting operation unit 100. In a case where data sampled by the zero-cross sampling unit 93 at a time $t_s$ has the same polarity as data sampled by the data sampling unit 92 at the prior time $t_{s-1}$ in the clock signal (2f), as shown in FIG. 4(b), the detection unit 94 determines that the phase of the clock signal (2f), precedes the output data from the delayed detecting operation unit 100.

Figure 1:
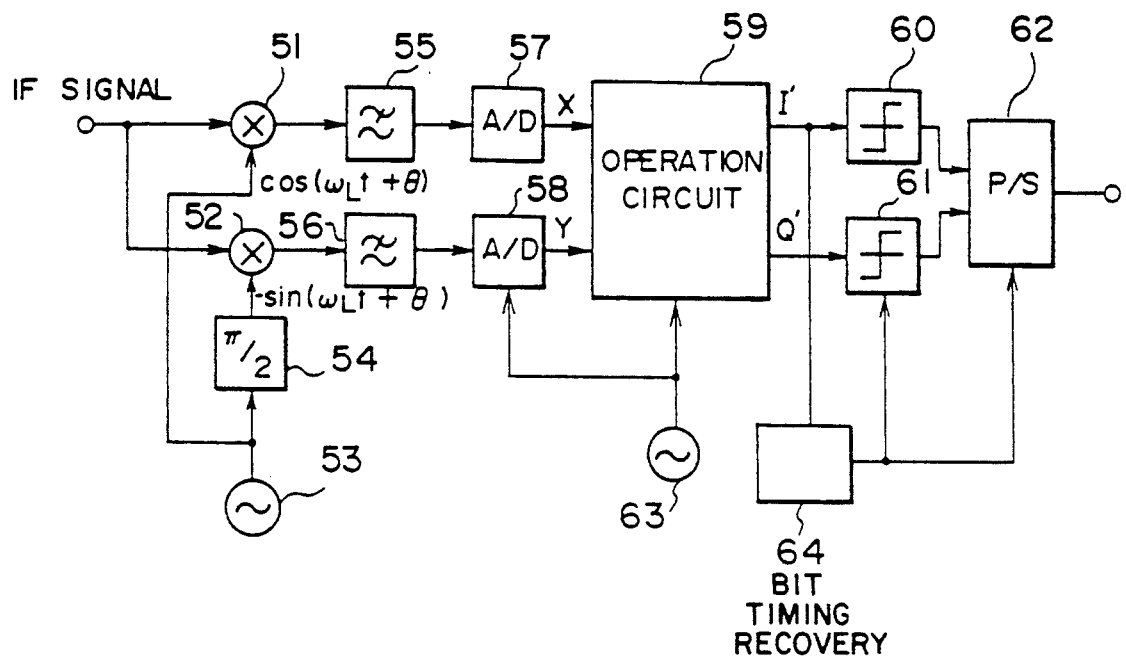
FIG. 1 is a block diagram illustrating a conventional base-band delayed detector.
Figure 2A:
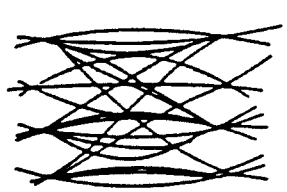
FIGS. 2A and 2B are diagrams illustrating eye patterns.
Figure 2B:
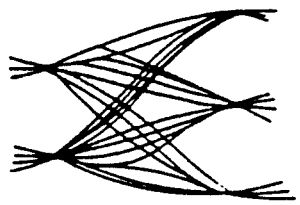
Figure 5:
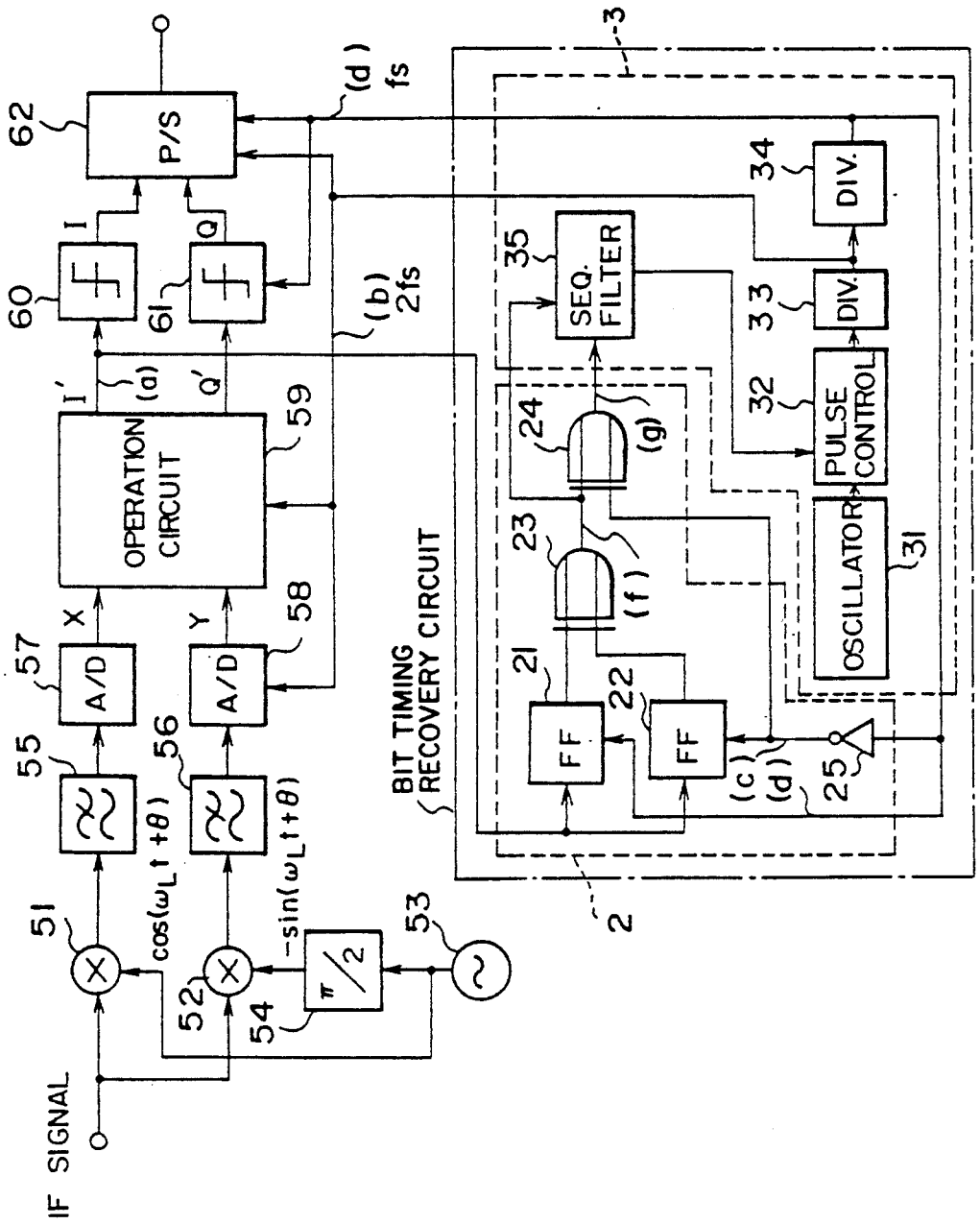
FIG. 5 is a block diagram illustrating a base-band delayed detector according to the first embodiment of the present invention.

A description will now be given of the first embodiment of the present invention with respect to FIGS. 5 and 6. In FIG. 5, those parts which are the same as those shown in FIG. 1 are given the same reference numbers. The base-band delayed detector shown in FIG. 5 is provided, for example, in a mobile station carrying out a mobile communication to a base station.

Referring to FIG. 5, which shows a base-band delayed detector operating in accordance with $\pi/4$ shift QPSK, the base-band delayed detector has the mixers 51 and 52, the local oscillator 53, the shifter 54, the low pass filters 55 and 56, the analog to digital converter 57 and 58, the operation circuit 59, the discriminators 60 and 61, and the parallel to serial converter 62.

A BTR (Bit Timing Recovery) circuit 1 is provided with the base-band delayed detector. The BTR circuit 1 has a phase comparison result detection unit 1 and a digital PLL unit 3. The operation circuit 59 outputs data I' (a) from an I-channel and data Q' from a Q-channel. The BTR circuit 1 generates a data sampling clock signal (d) having a frequency fs equal to a symbol rate of a base-band signal operated in this base-band delayed detector. The data sampling clock signal (d) is supplied to the discriminators 60 and 61 and the parallel to serial converter 62. The BTR circuit 1 also generates a clock signal (b) having a frequency (2fs) twice as large as the symbol rate of the base-band signal. The clock signal (b) is supplied to the analog to digital converters 57 and 58, the operation circuit 59, the discriminators 60 and 61 and the parallel to serial converter 62.

The phase comparison result detection unit 2 has a first flip flop 21, a second flip flop 22, a first exclusive OR circuit 23 (EOR circuit 23) and a second exclusive OR circuit 24 (EOR circuit 24). The first flip flop 21 samples a MSB (Most Significant Bit) of the data I' output from the I-channel of the operation circuit 59 in synchronism with the data sampling clock signal (d). The MSB of the data I' represents a polarity thereof. The data sampling clock signal (d) is inverted by an inverter 25, so that a zero-cross sampling clock signal (c) is obtained. The second flip flop 22 samples the MSB of the data I' output from the I-channel of the operation circuit 59 in synchronism with the zero-cross sampling clock signal (c). A first output signal of the first flip flop 21 and a second output signal of the second flip flop 22 are input to the first EOR circuit 23. An output (f) of the first EOR circuit 23 is supplied to the second EOR circuit 24 controlled by the zero-cross sampling clock signal (c). An output (g) is supplied to the digital PLL unit 3. The output (f) of the first EOR circuit 23 is referred to as a changing point detection signal, and the output (g) of the second EOR circuit 24 is referred to as a phase comparison signal. When the polarity of the data I' is changed, the changing point detection signal is activated. When the zero-cross sampling clock signal (c) has a phase lag with respect to each zero-cross point of the eye pattern, the phase comparison signal (g) has a low level (L). When the zero-cross sampling clock signal (c) has a phase preceding each zero-cross point of the eye pattern, the phase comparison signal (g) has a high level (H).

The digital PLL unit 3 has a sequential filter 35, an oscillator 31, a pulse control circuit 32, a first divider 33 and a second divider 34. The oscillator 31 outputs a clock signal having a predetermined frequency. The pulse control circuit 32 adds one or plurality of pulses to the clock signal output from the oscillator 31 in accordance with the phase comparison signal (g) supplied thereto via the sequential filter 35. The first divider 33 divides a pulse signal output from the pulse control circuit 32 so that the output is a clock signal having a frequency (2f) twice as large as the symbol rate. The second divider 34 divides the clock signal having the frequency (2fs) output from the first divider 33 to output the clock signal having a frequency (fs) equal to the symbol rate. The sequential filter 35 has an up-down counter. The up-down counter respectively carries out an up-count operation and down-count operation in synchronism with the changing point detection signal (f) in accordance with the levels (H) and (L) of the phase comparison signal (g). When a count value in the up-down counter reaches an upper limit value, the pulse control circuit 32 subtracts one or a plurality of pulses from a pulse signal output from the oscillator 31 so that a phase of the clock signal (2fs) precedes. When a count value in the up-down counter reaches a lower limit value, the pulse control circuit adds one or plurality of pulses to the pulse signal output from the oscillator 31 so that a phase of the clock signal (2fs) lags. Due to the sequential filter 35, errors based on jitter of the clock signal are prevented from being generated.

Figure 6:
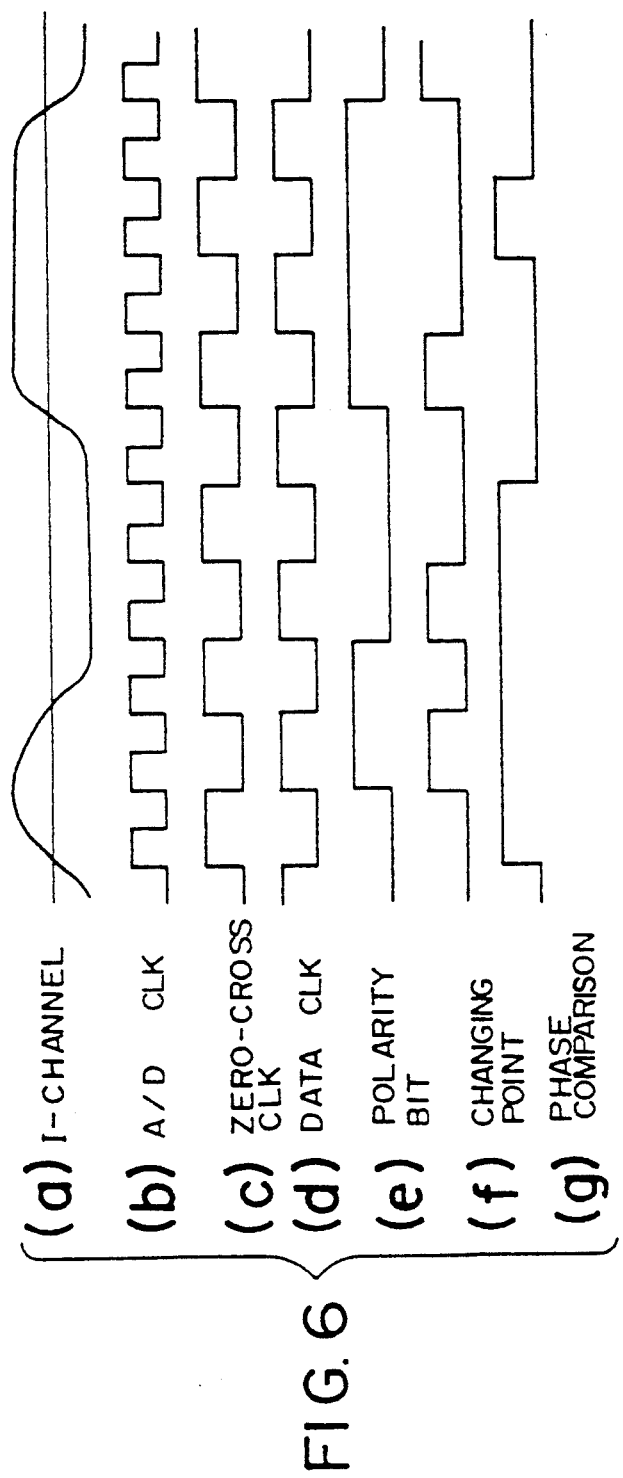
FIG. 6 is a timing chart illustrating signals generated in the base-band delayed detector shown in FIG. 5.

The BTR circuit 1 is operated in accordance with a timing chart shown in FIG. 6.

The I-channel data (a), the clock signal (b), the zero-cross sampling clock signal (c), the data sampling signal (d), a polarity bit (e), the changing point detection signal (f) and the phase comparison signal (g) are indicated in FIG. 6. The polarity bit (e) is the MSB of the data I' output from the I-channel of the operation signal, so that the polarity bit (e) represents a polarity of the I-channel data (a) sampled in synchronism with the clock signal (b). The clock signal (b) can be divided into the zero-cross sampling clock signal (c) and the data sampling clock signal (d). The zero-cross sampling clock (c) is used for sampling the level (data) of the base band signal at a point close to each zero-cross point of the eye pattern. The data sampling clock signal (d) is used for sampling the level (data) of the base band signal at a point close to each opening of the eye pattern. A relationship between the polarity of the data sampled in synchronism with the data sampling clock signal (d) and the polarity of the data sampled in synchronism with the zero-cross sampling clock signal (c) represents a condition of the phase of the clock signal (b) with respect to the eye pattern (the base band signal). That is, in a case where the polarity of the data sampled in synchronism with the zero-cross sampling clock signal (c) at a time (zero-cross sampled time) is equal to the polarity of the data sampled in synchronism with the data sampling clock signal (d) at a time prior to the zero-cross sampled time by one clock of the clock signal (b), there is no zero-cross point between a rising point of the zero-cross sampling clock signal (c) and a rising point of the data sampling clock signal (d). Thus, in this case, it can be determined that a phase of the clock signal (b) precedes a phase of the eye pattern. Alternatively, in a case where the polarity of the data sampled in synchronism with the zero-cross sampling signal (c) at a time (zero-cross sampled time) is equal to the polarity of the data sampled in synchronism with the data sampling signal (d) at a time after the zero-cross sampled time by one clock of the clock signal (b), there is a zero-cross point between a rising point of the zero-cross sampling clock signal (c) and a rising point of the data sampling clock signal (d). Thus, in this case, it can be determined that a phase of the clock signal (b) lags from a phase of the eye pattern.

In the phase comparison result detection unit 2, signals are generated as follows.

The first EOR circuit 23 carries out an exclusive OR operation of the output signals of the first and second flip flops 21 and 22 (a differential full-wave rectification), so that the changing point detection signal (f) is output from the first EOR circuit 23. The changing point detection signal represents a point at which the polarity of the I-channel data (a) is changed. Further, the second EOR circuit 24 carries out an exclusive OR operation of the changing detection signal (f) and the zero-cross sampling clock signal (c), so that the phase comparison signal (g) is output from the second EOR circuit 24. In a case where the changing point detection signal (f) has a high level (H), a high level (H) of the phase comparison signal (g) indicates that a phase of the clock signal (b) precedes that of the eye pattern, and a low level (L) of the phase comparison signal (g) indicates that a phase of the clock signal (b) lags from that of the eye pattern.

In a case where each rising point of the zero-cross sampling clock signal (c) corresponds to each zero-cross point of the eye pattern corresponds to each, the clock signal (b) has an appropriate phase. In this case, data can be sampled in synchronism with the data sampling clock signal (d) at a center point in the opening of the eye pattern, so that the data is stably demodulated. Thus, the digital PLL unit 3 controls the phase of the clock signal (b) based on the phase comparison signal (f).

In the digital PLL unit 3, the pulse control circuit 32 adds to or subtracts one or a plurality of pulses from the pulse signal output of the oscillator 31 in accordance with the phase comparison signal (g) supplied from the phase comparison unit 2. As a result, a phase of the clock signal (b) output from the first divider 33 and a phase of the data sampling clock signal (d) are controlled. In an equilibrium state, the level of the phase comparison signal (g) is alternatively changed from high level (H) to the low level (L) and vice versa.

The phase comparison signal (g) can be generated from an exclusive OR operation between the changing point detection signal (f) and the data sampling clock signal (d). In this case, a relationship between levels (H and L) of the phase comparison signal (g) and the phase shift (preceding and lagging) of the clock signal (b) is reversed.

Figure 7:
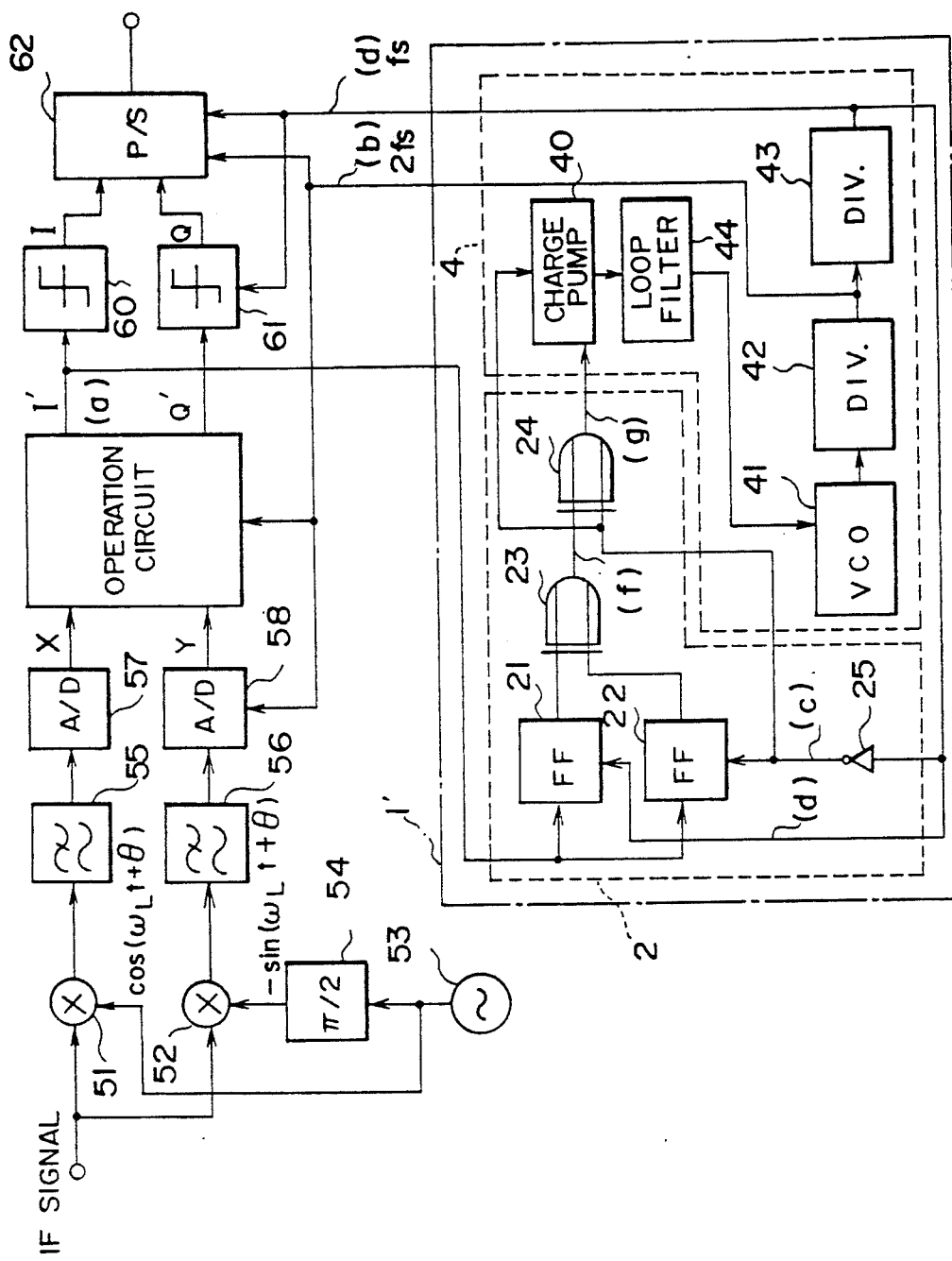
FIG. 7 is a block diagram illustrating a modification of the first embodiment.

A description will now be given of a modification of the first embodiment of the present invention with reference to FIG. 7. In the modification shown in FIG. 7, the base-band delayed detector is provided with a PLL unit 4, formed of a analog circuit, substituting for the digital PLL unit 3 shown in FIG. 5. In FIG. 7, those parts which are the same as those shown in FIG. 5 are given the same reference numbers.

Referring to FIG. 7, the phase comparison signal (g) output from the phase comparison result detection unit 2 of the BTR circuit 1' is supplied to an analog PLL unit 4. The analog PLL unit 4 has a charge pump 40, a loop filter 44, a voltage control oscillator (VCO) 41, a first divider 42 and a second divider 43. The BTR circuit 1' operates in the same manner as that shown in FIG. 5. The phase comparison signal (g) is supplied, as a control voltage, from the phase comparison result detection unit 2 to the voltage control oscillator 31 via the charge pump 40 and the loop filter 44. A frequency of an output signal from the voltage control oscillator 43 is controlled in accordance with the phase comparison signal (g). Thus, a phase of the clock signal (b) output from the first divider 42 and a phase of the data sampling clock signal (b) output from the second divider 43 are controlled. When the changing point detection signal (f) has a high level (H), the charge pump 40 outputs a voltage level corresponding to the phase comparison signal (g). When the changing point detection signal (f) has a low level (L), the output of the charge pump 40 becomes a high impedance.

Figure 8:
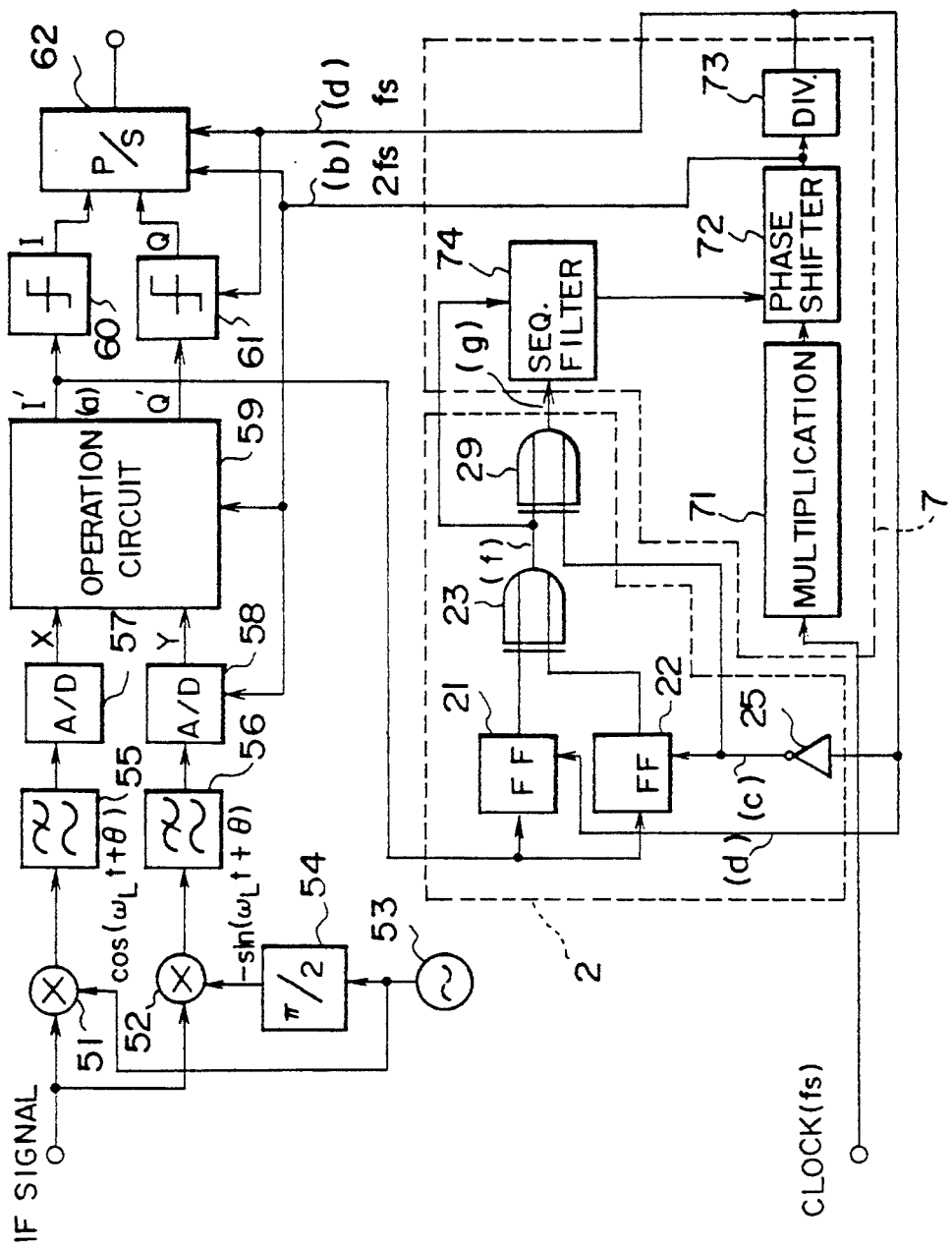
FIG. 8 is a block diagram illustrating a base-band delayed detector according to a second embodiment of the present invention.

A description will now be given of a second embodiment of the present invention with reference to FIG. 8. A base-band delayed detector shown in FIG. 8 is provided, for example, in a base station carrying out a mobile communication to a mobile station. In the base station, a symbol rate of a transmission signal from the base station is equal to that of a received signal. Thus, a clock signal having a frequency (fs) equal to the symbol rate of the received signal can be provided with the base station by itself. In FIG. 8, those parts which are the same as those shown in FIG. 5 are given the same reference numbers.

Referring to FIG. 8, a clock regenerative circuit 7 is connected to the phase comparison result detection unit 2. The clock regenerative circuit 7 has a multiplication circuit 71, a phase shifter 72, a divider 73 and a sequential filter 74. A clock signal, having a frequency (fs), generated by a device in which the base-band delayed detector itself is provided, is supplied to the multiplication circuit 71. The multiplication circuit 71 increases a frequency of the input signal, so that the clock signal (b) has a a frequency (2fs) twice as large as that (fs) of the input signal. The phase shifter 72 shifts a phase of the clock signal output from the multiplication circuit 71 in accordance with the phase comparison signal (g) supplied from the phase comparison unit 2 to the phase shifter 72 via the sequential circuit 74. The clock signal whose phase is shifted by the phase shifter 72 is supplied to the divider 73, so that the data sampling clock signal (d) having a frequency (fs) is output from the divider 73.

The base-band delayed detector shown in FIG. 8 operates in the approximately same manner as that shown in FIG. 5.

In the above embodiments, a phase of the clock signal (b) is detected based on the output data I' from the I-channel of the operation circuit 59. However, a phase of the clock signal (b) can be detected based on the output data Q' from the Q-channel of the operation circuit 59. In addition, a phase comparison signal, which is a logical sum of a first phase comparison signal generated based on the data I' from the I-channel and a second phase comparison signal generated based on the data Q' from the Q-channel, can be used for controlling a phase of the clock signal (b). In this case, reliability of the base-band delayed detector can be further improved.

Further, in the above embodiments, the clock signal (b) having a frequency (2fs) twice as large as the symbol rate of the base band signal to be processed in the operation circuit 59 is used as a time clock of the analog to digital converters 57 and 58, the operation circuit 59 and so on. However, a clock signal having a afrequency (2n·fs) 2n times as large as the symbol rate can be used as the timing clock signal.

The present invention is not limited to the aforementioned embodiments, and variations and modifications may be made without departing from the scope of the claimed invention.

What is claimed is:

1. A base-band delayed detector receiving an input signal and having operation means performing, in synchronism with a clock signal, a delayed detecting operation on the input signal, said operation means outputting an altered signal having a predetermined symbol rate, said base-band delayed detector comprising:
   clock generation means for generating a clock signal having a frequency 2×n times as high as the predetermined symbol rate, said clock signal being used as a timing signal for said operation means, where n is an integer;
   dividing means for dividing said frequency of said clock signal, generating a divided signal;
   inverting means for inverting said divided signal, generating an inverted signal;
   detection means for detecting a pattern of polarities of said altered signal at predetermined timings defined by said divided signal and said inverted signal;
   determining means for making a determination whether a phase of said clock signal one of lags and precedes a phase of said altered signal based on said pattern of polarities detected by said detection means;
   shifting means for shifting the phase of the clock signal based upon said determination in order to synchronize said clock signal with said altered signal; and
   data determination means for identifying a synchronized state when said altered signal is synchronized with said clock signal, and outputting said altered signal during said synchronized state.

2. The base-band delayed detector as claimed in claim 1, wherein said frequency of said clock signal generated by said clock generation means is twice as high as the predetermined symbol rate, n being equal to one.

3. The base-band delayed detector as claimed in claim 1, wherein said shifting means comprises means for one of adding to and subtracting from said clock signal at least one pulse, based upon said determination.

4. The base-band delayed detector as claimed in claim 1, wherein said input signal is a $\pi/4$ shifted QPSK (Quad Phase Shift Keying) signal, and the operation means output an I-channel signal and a Q-channel signal, one of said I-channel signal and said Q-channel signal being used as said altered signal.

5. The base-band delayed detector as claimed in claim 1, wherein: said detection means further comprises:
   first sampling means for sampling said altered signal in response to said divided signal, generating a first sampled signal,
   second sampling means for sampling said altered signal in response to said inverted signal, generating a second sampled signal, and
   a first exclusive OR gate receiving said first and second sampled signals, and in response, generating a changing point detection signal indicative of a point at which a polarity of said clock signal changes; and
   said determining means further comprises a second exclusive OR gate receiving said changing point detection signal and said inverted signal and, in response, generating a phase comparison signal indicative of whether said phase of said clock signal one of lags and precedes said phase of said altered signal.

6. A base-band delayed detector receiving an input signal and having operation means performing, in synchronism with a clock signal, a delayed detecting operation on the input signal, said operation means outputting an altered signal having a predetermined symbol rate, said base-band delayed detector comprising:
   clock generation means for generating a clock signal having a frequency 2 times as high as the predetermined symbol rate, said clock signal being used as a timing signal for said operation means;
   first generation means for generating a first clock signal based on said clock signal generated by said clock generation means, said first clock signal having a frequency half that of said clock signal;
   second generation means for generating a second clock signal based on said clock signal generated by said clock generation means, said second clock signal having a frequency half that of said clock signal and being in an inverted state relative to said first clock signal;
   first sampling means for sampling a first polarity of said altered signal output from said operation means in synchronism with said first clock signal;
   second sampling means for sampling a second polarity of said altered signal output from said operation means in synchronism with said second clock signal;
   means for making a determination whether a phase of said clock signal one of lags and precedes a phase of said altered signal based on an arrangement of said first and second polarities respectively sampled by said first and second sampling means;
   shifting means for shifting the phase of the clock signal based upon said determination in order to synchronize said clock signal with said altered signal; and
   data determination means for identifying a synchronized state when said altered signal is synchronized with said clock signal, and outputting said altered signal during said synchronized state.

7. The base-band delayed detector as claimed in claim 6, wherein said shifting means comprises means for shifting the phase of said clock signal generated by said clock generation means so that said first clock signal generated by said first generation means is synchronized with zero-cross points of an eye pattern formed from said altered signal.

8. The base-band delayed detector as claimed in claim 6, wherein said shifting means further comprises means for one of adding to and subtracting from said clock signal generated by said clock generation means at least one pulse based upon said determination.

9. The base-band delayed detector as claimed in claim 6, wherein said data determination means determines that output data in said altered signal is in synchronism with said second clock signal generated by said second generation means.

10. The base-band delayed detector as claimed in claim 6, wherein said input signal is a $\pi/4$ shifted QPSK signal, and the operation means outputs an I-channel signal and a Q-channel signal, said means for making a determination determining whether the phase of said clock signal one of lags and precedes a phase of each of said I-channel signal and said Q-channel signal output and, in response, generating respective first and second phase comparison signals, each of said I-channel and said Q-channel signal being said altered signal, said shifting means generating a sum of said first and second phase comparison signals and shifting the phase of the clock signal based upon said sum, to synchronize said clock signal with said I-channel signal and said Q-channel signal.

* * * * *

UNITED STATES PATENT AND TRADEMARK OFFICE
CERTIFICATE OF CORRECTION

PATENT NO. : 5,317,602
DATED : May 31, 1994
INVENTOR(S) : ONODA et al.

It is certified that error appears in the above-indentified patent and that said Letters Patent is hereby corrected as shown below:

Col. 1, line 45, change "BTC" to --BTR--.

Col. 5, line 40, change "1" to --2--.

Col. 7, line 47, delete "corresponds to each".

Col. 9, line 17, change "aafrequency" to --a frequency--;
line 61, change "clained" to --claimed--;
line 68, change "output" to --outputs--.

Col. 11, line 14, after "QPSK" insert --(Quad Phase Shift Keying)--.

Signed and Sealed this

Fifteenth Day of August, 1995

Attest:

BRUCE LEHMAN

Attesting Officer    Commissioner of Patents and Trademarks